Aug. 7, 1923.
J. M. KISHPAUGH
ARTIFICIAL BAIT TRAP
Filed Sept. 19, 1922
1,464,387
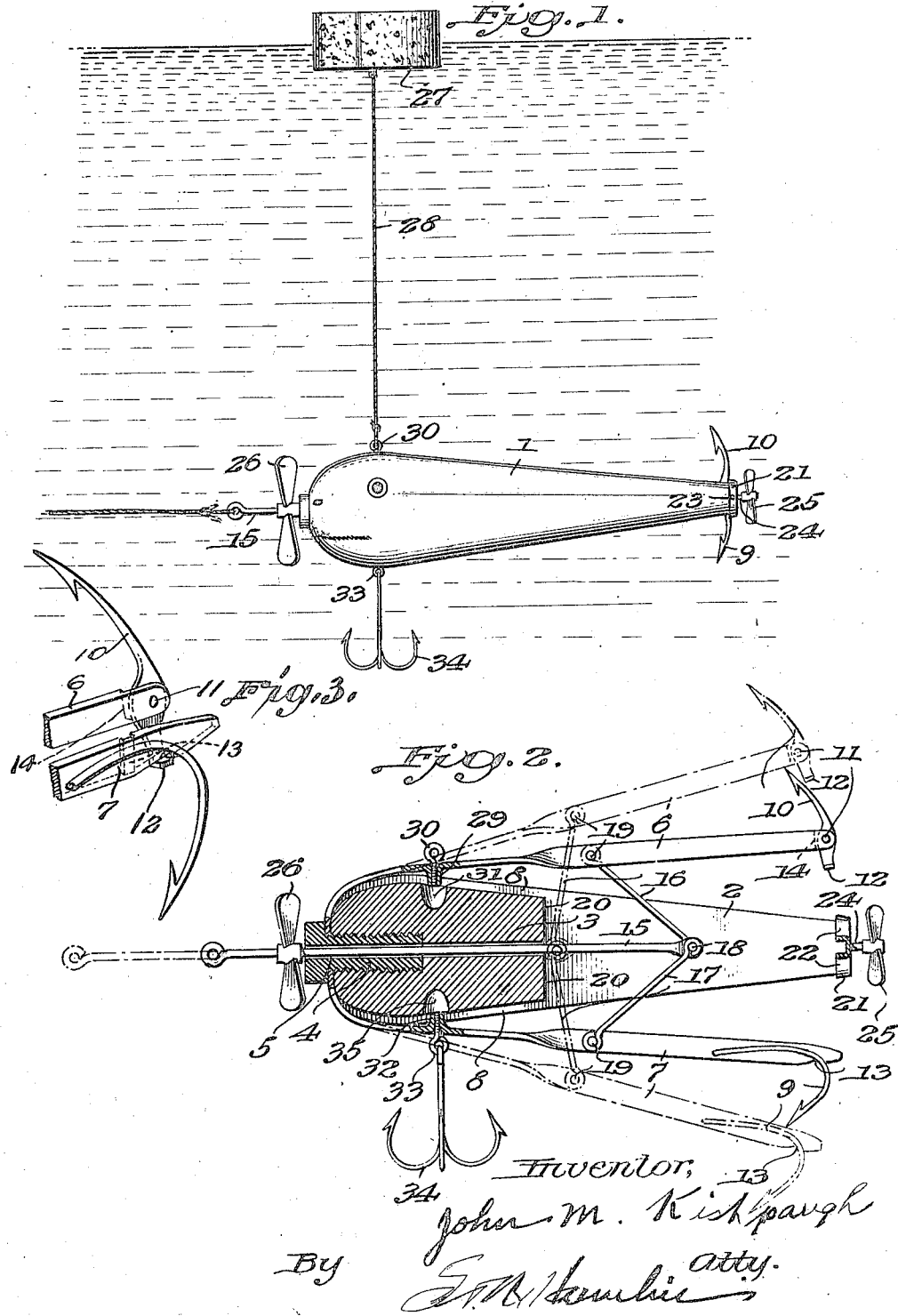

Patented Aug. 7, 1923.

1,464,387

UNITED STATES PATENT OFFICE.

JOHN MARTIN KISHPAUGH, OF NEWTON, NEW JERSEY.

ARTIFICIAL-BAIT TRAP.

Application filed September 19, 1922. Serial No. 589,115.

*To all whom it may concern:*

Be it known that I, JOHN M. KISHPAUGH, a citizen of the United States, residing at Newton, in the county of Sussex and State of New Jersey, have invented certain new and useful Improvements in Artificial-Bait Traps, of which the following is a specification.

This invention relates to that class of artificial bait having expanding hooks which are set and combined with means for their automatic release when the fish takes the hook.

The object of the invention is the provision of an artificial bait trap having means by which, once the hooks are released by the fish taking the bait, the pull of the fish and of the line will automatically lock the hooks in expanded position in the mouth of the fish, thus securely hooking the fish and preventing him from collapsing the hooks and disgorging them.

The foregoing object is accomplished by the provision of spring arms of novel construction and arrangement in relation to the body of the bait, hooks and trigger means carried by the arms, and a pull wire and toggle arrangement, adapted to be connected to the line, by which the pull of the fish and pull on the line causes the arms to be locked against collapsing toward each other.

A further object of the invention is the provision of means for the attachment of a float so that the bait may be used in deep water fishing at a desired distance below the surface; further, means for attaching a gang hook.

These latter objects are accomplished by the provision of means on the spring arms for the attachment of the float and gang hook, said means being detachable so that these devices may be dispensed with when not needed so as to then afford a smooth and unobstructed exterior which will minimize danger of the bait catching on weeds.

My invention also contemplates the provision of details of improvement of different parts of the bait and the means for operating the hooks.

I am aware that modifications may be resorted to in carrying out the essential principle of the invention having to do with the spring arms and the means for spreading and locking them in spread relation and that other changes may be resorted to without departing from the spirit of the invention and it is to be considered that such modifications are covered by the claims except where the intent to the contrary is definitely set forth.

In the accompanying drawings:

Figure 1 is a side elevation showing the bait in the water, ready for use and provided with a float and a gang hook;

Fig. 2 is a longitudinal section of the bait, full lines showing the spring arms in normal expanded position and dotted lines showing them when further expanded by the pull wire and locked by the toggle joint; and Figure 3 is a detail view of the releasable locking device or catch for the hooks.

Preferably, the body 1 of the bait will be of wood or some other material which will float and it is shaped in simulation of a fish, frog, or other bait and suitably colored or painted and provided with representations of eyes. The body is provided with a longitudinally extending slot 2 and with a bore 3.

Screwed into the head of the body 1 is a headed screw 4 which has a bore 5 alined with the bore 3.

Connected spring arms 6 and 7 are held to the body 1 by the head of the screw 4, said arms being otherwise free for expansion, when released. The body is provided with grooves or channels 8 for the reception of those parts of the springs arms 6 and 7 lying between the screw 4 and the slotted part 2 so that said spring arms will lie substantially flush with the exterior of the body and present no obstruction for engagement by weeds.

Carried by the free ends of the spring arms 6 and 7 are hooks, one of which, 9, is rigid, while the other, 10, is pivoted at 11 and serves as a trigger. This trigger hook may also be barbed, if desired. The hooks 9 and 10 extend in opposite directions so as to enter the upper and lower parts of the mouth of the fish. The trigger hook 10 is provided with a catch 12 adapted to engage the end of the opposite spring arm, when properly set, but when the trigger hook 10 is pulled upon by the fish, the catch 12 moves into line with a notch 13 and the spring arms are then released. To limit the swinging of the trigger hook 10, there is provided a shoulder 14 on the spring arm which allows only a limited play of the trigger hook in opposite directions.

Slidable through the bores 3 and 5 is a pull wire 15 to which the fish line is connected. Links 16 and 17 are pivoted at 18 to the pull wire and at 19 to the spring arms 6 and 7, said links forming a toggle joint or connection between the wire 15 and the spring arms 6 and 7 by which said spring arms may be locked in the positions to which they move by their inherent springiness when they are released or in greater spread relation, the purpose being to lock the hooks 9 and 10 firmly in the upper and lower parts of the mouth of the fish so that it will be impossible for the fish to collapse the arms and disgorge the bait and hook or to free himself.

Once the fish is hooked, when he pulls in an effort to free himself, or when the fisherman pulls on the line, this causes the body 1 to move in relation to the wire 15 and results in an instantaneous locking of the spring arms 6 and 7, whereupon they become set in their spread relationship because the links move to a point past their dead center before they strike the shoulders 20 on the body 1. It is therefore impossible for the fish, by closing his jaws, to compress the arms 6 and 7 toward each other.

Fitted over the tail end of the body 1 is a cap 21 which may be secured in any suitable manner as, for instance, by crimped or bent parts 22 entering the sides of the slot 2 and suitably punched or indented points 23. Secured to the cap is a short spindle 24 on which is rotatably mounted any suitable spinner 25.

Another, and larger spinner 26 may be rotatably mounted on the pull wire 15.

As it may be desirable to use the bait trap in deep water fishing, I provide means for the attachment of any suitable float 27 and wire 28. Formed on the inside of the arm 6 is an internal screw threaded socket 29 adapted to receive a detachable screw 30 having an eye for the attachment of the wire 28. The body 1 may be recessed at 31 to accommodate the socket 29. A sinker will be used.

A socket 32 similar to the socket 29 may be provided on the inside of the spring arm 7 to receive a detachable screw eye 33 which is similar to the screw eye 30. A gang hook 34 is connected to the screw eye 33.

When the float and the gang hook are not needed, the screw eyes 30 and 33 are detached, together with the float, wire and gang hook. A concavity 35 is provided in the body 1 to accommodate the socket 32.

Fish may strike the trigger hook 10 without causing the arms 6 and 7 to be sprung but if a fish takes the trigger hook into his mouth, he immediately causes release of the arms 6 and 7 which then spring away from each other, thus hooking the fish and when the fish pulls, the wire 15 and links 16 and 17 cause an instant locking of the spring arms which results in their being locked in expanded relation so that it is impossible for the fish to disgorge the bait and hooks.

I claim:

1. In an artificial bait trap, the combination with spring-actuated expanding arms carrying hooks and releasable trigger mechanism for holding said arms in folded relationship, of means operably connected to the fishing line adapted for moving said arms farther apart in relation to each other after they have been expanded on being released and for locking them in such further expanded relationship.

2. In an artificial bait trap, the combination with spring-actuated expanding arms carrying hooks and releasable trigger mechanism for holding said arms in folded relationship, of a toggle joint connecting the spring arms, and means operably connected to the fishing line adapted for setting said toggle joint to lock the arms in expanded position.

3. In an artificial bait trap, the combination with spring-actuated expanding arms carrying hooks and releasable trigger mechanism for holding said arms in folded relationship, of a toggle joint connecting the spring arms, and means for moving said toggle joint past its dead center for the purpose of locking said arms in their expanded relationship.

4. In an artificial bait trap, the combination with spring-actuated expanding arms carrying hooks and releasable trigger mechanism for holding said arms in folded relationship, of a pull wire adapted for connection to the line, and links connecting said pull wire to said spring-actuated arms, thus providing a toggle joint connecting the spring-actuated arms which is adapted for locking the arms in their expanded position.

5. In an artificial bait trap, the combination with spring-actuated expanding arms carrying hooks and releasable trigger mechanism for holding said arms in folded relationship, of a pull wire adapted for connection to the line, and links connecting said pull wire to said spring-actuated arms, thus providing a toggle joint connecting the spring-actuated arms which is adapted for relatively expanding the arms beyond the position to which they spring when released, means being provided to arrest the toggle joint aforesaid after it has passed its dead center so that the spring-actuated arms will be locked in their expanded relationship.

6. In an artificial bait trap, the combination with arms of spring material adapted to expand or diverge in relation to each other, and hooks and releasable trigger mechanism carried by the arms for holding said arms in folded relationship, of means operably connected to the fishing line adapted for moving said arms farther apart in relation to each other after they have been released and for locking said spring arms in such further expanded relationship.

7. In an artificial bait trap, the combination with arms of spring material adapted to expand or diverge in relation to each other, and hooks and releasable trigger mechanism carried by the arms for holding said arms in folded relationship, of a pull wire adapted for connection to the line, and a toggle joint connecting said pull wire to said spring arms whereby said spring arms may be locked in spread position.

8. In an artificial bait trap, the combination with a floatable body having a bore, of a screw which is entered in the body and has a bore alining with the bore in the body, spring-actuated arms secured by the screw, hook and trigger mechanism carried by the arms, a pull wire slidable through the bores aforesaid, and operative connections between the pull wire and the spring-actuated arms.

9. In an artificial bait trap, the combination with a floatable body having a bore, of a screw which is entered in the body and has a bore alining with the bore in the body, spring-actuated arms secured by the screw, hook and trigger mechanism carried by the arms, a pull wire slidable through the bores aforesaid, and a toggle joint connecting the pull wire with the arms, said wire and toggle joint serving to lock the arms in expanded position.

In testimony whereof I affix my signature.

JOHN MARTIN KISHPAUGH.